United States Patent [19]

Shirk

[11] Patent Number: 5,485,865

[45] Date of Patent: Jan. 23, 1996

[54] AIR VOLUME CONTROL VALVE FOR WATER SYSTEM PRESSURE TANK

[75] Inventor: Thomas N. Shirk, Beatrice, Nebr.

[73] Assignee: Dempster Industries, Inc., Beatrice, Nebr.

[21] Appl. No.: 333,022

[22] Filed: Nov. 1, 1994

[51] Int. Cl.$^6$ ............................................. F16K 31/18
[52] U.S. Cl. ........................ 137/209; 137/202; 137/206
[58] Field of Search ............................... 137/202, 206, 137/207, 209

[56] References Cited

U.S. PATENT DOCUMENTS

| | | | |
|---|---|---|---|
| 350,628 | 10/1886 | Howes | 137/439 |
| 1,090,244 | 3/1914 | Staples | 137/209 |
| 1,403,041 | 1/1922 | Lawson | 137/439 X |
| 2,711,465 | 6/1955 | Sanborn | 137/209 X |
| 3,733,449 | 5/1973 | Parker | 137/209 X |
| 4,586,528 | 5/1986 | Andres et al. | 137/202 |

Primary Examiner—Gerald A. Michalsky
Attorney, Agent, or Firm—Hovey, Williams, Timmons & Collins

[57] ABSTRACT

An air volume control valve apparatus is provided for use with a water system pressure tank. The apparatus includes an elongated tube that is supported on the tank with a first end exposed to an area exterior of the tank and a second end within the tank. A valve is provided for controlling the volume of air in the tank. The valve includes an elongated, buoyant float member having a first axial end supported for pivoting movement on the tube about a pivot axis extending in a direction transverse to the length of the tube, and a second free end opposite the first end. As the water level rises in the tank beyond a predetermined level, the float member is lifted on the water to an upper pivoted position in which the second end of the tube is closed off, and when the water level drops beneath the predetermined level, the float member pivots away from the upper position and the second end of the tube is uncovered.

12 Claims, 1 Drawing Sheet

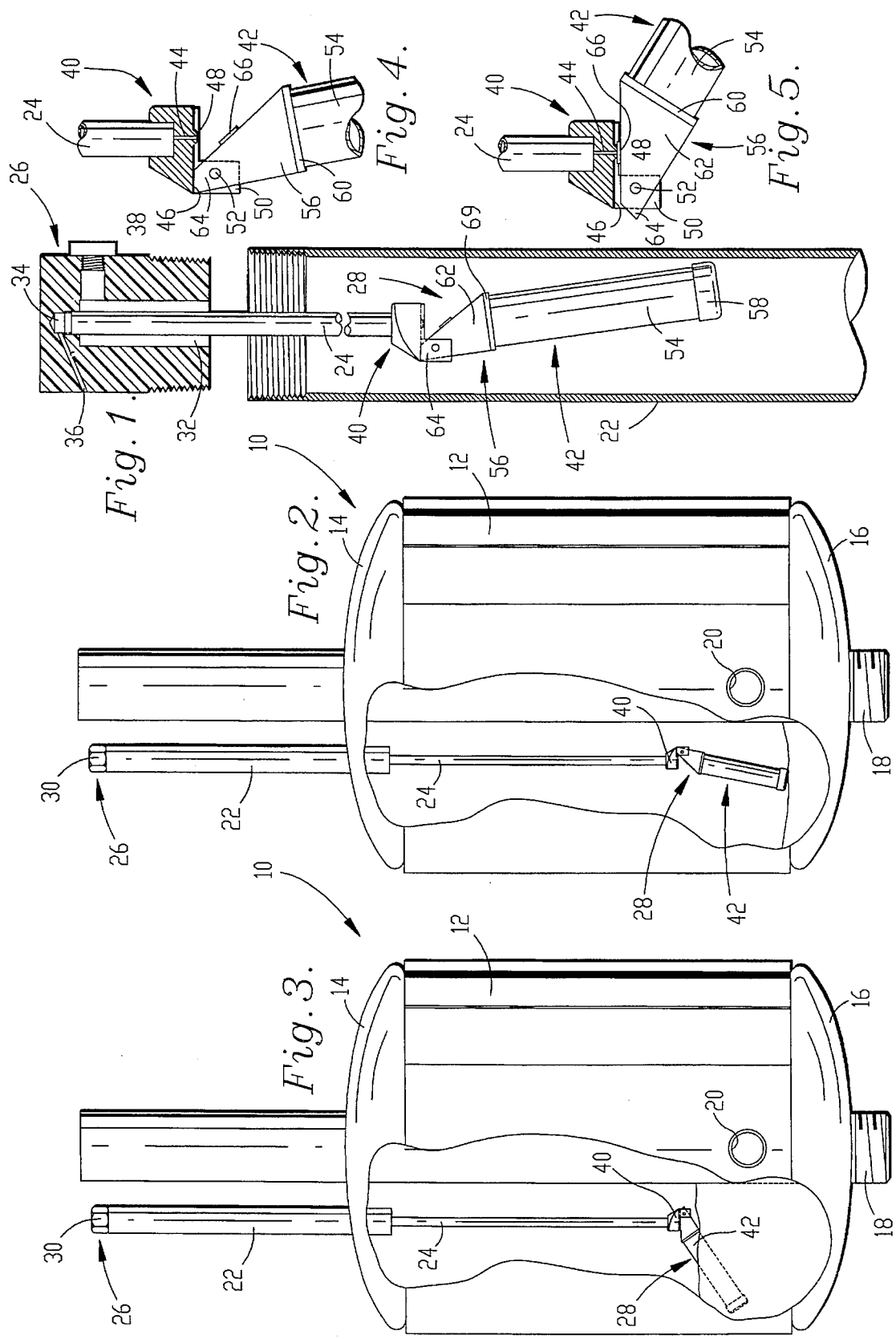

AIR VOLUME CONTROL VALVE FOR WATER SYSTEM PRESSURE TANK

BACKGROUND OF THE INVENTION

1. Field of the Invention

The present invention relates generally to pressurized water supply systems and, more particularly, to an air volume control valve apparatus for use with a water system pressure tank.

2. Discussion of the Prior Art

In rural areas wells are frequently the only source of water readily available to local residents. In order to supply this water to a home or business at a generally constant pressure, it is known to employ a pressurized water supply system.

This known type of supply system includes a holding tank that is charged to a predetermined pressure with air so that water stored in the tank may be drawn at will by opening a faucet downstream of the tank, the water being delivered under pressure to the faucet. The system also includes a pump that is actuated when the pressure in the tank drops below a predetermined minimum pressure. Once actuated, the pump operates until the pressure in the tank reaches a predetermined maximum pressure.

Typically, conventional pressurized water supply systems include some means for recharging the air within the tank in order to maintain the desired pressure. This means compensates for the loss of air into the water, and replenishes the air in the tank during each cycle of operation of the pump.

However, the air charging means in conventional systems delivers slightly more air to the tank than is necessary to maintain the desired volume, resulting in a build-up of the volume which displaces the water level in the tank. If the volume of air in the tank becomes too excessive, the water level is pushed beneath the outlet opening of the tank, allowing the air to enter the downstream plumbing. This creates a nuisance and adversely affects the quality of the system.

A conventional solution to this problem is to provide an air volume control valve within the tank for releasing excess air that is introduced by the recharging means of the system. The air volume control valve includes a tube extending into the tank and presenting a restricted orifice through which the tube is in communication with the tank, and a float positioned beneath the orifice for vertical linear translation between a lower flow-permitting position exposing the orifice and a raised flow-preventing position blocking the orifice.

The control valve is positioned within the tank at a predetermined height such that the float is held in the raised position as long as the water level is above the minimum desired level. However, as the water drops below this minimum level, the float drops under the force of gravity toward the flow-permitting position so that air is released from the tank.

A problem experienced with this conventional type of air volume control valve is that the float has a tendency to remain drawn against the orifice in the tube since the float is not heavy enough to overcome the pressure differential between the tank and the ambient conditions within the tube. Although it is possible to combat this problem by reducing the size of the orifice relative to the float, such a reduction in the orifice size creates a new problem in that sediment and other solids plug the orifice and prevent proper venting of air from the tank.

OBJECTS AND SUMMARY OF THE INVENTION

It is an object of the present invention to provide a valve apparatus that accurately controls the volume of air in a water system pressure tank, while being simple to construct, reliable and durable. At the same time, it is an object of the invention to overcome the noted problems in the prior art by presenting a valve construction including a pivotable float that reliably drops away from a valve opening without sticking.

Another object of the present invention is to provide a valve apparatus having a low profile capable of being inserted through a vent tube having an inner diameter as small as about 1.5 inches, such that it is possible to substitute the valve apparatus in place of conventional valve devices in an existing water system pressure tank.

In accordance with these and other objects evident from the following description of a preferred embodiment of the invention, an air volume control valve is provided which includes an elongated tube, a support means for supporting the tube on a water system tank, and a valve means provided at the lower end of the tube for controlling the air volume in the tank.

The valve means closes off the lower end of the tube when the water level in the tank is above a predetermined level so that air is not permitted to flow into the tube from the tank. The valve uncovers the end of the tube when the water level in the tank drops below the predetermined level so that air is permitted to escape the tank through the tube. The valve means includes an elongated float having a first axial end supported for pivoting movement on the tube about a pivot axis extending in a direction transverse to the length of the tube, and a second free end opposite the first end.

The float is buoyant in water so that as the water level rises in the tank beyond a predetermined level, the float is lifted on the water to an upper pivoted position in which the second end of the tube is closed off. When the water level drops beneath the predetermined level, the float pivots to a lowered position in which the second end of the tube is uncovered.

By providing a construction in accordance with the present invention, several advantages are realized. For example, by providing a float that is supported for pivoting movement on the tube about an axis transverse to the length of the tube, a mechanical advantage is obtained which substantially increases the force exerted by the float on the seat when the float is raised to the upper pivoted position. In addition, this mechanical advantage is also present when the float pivots away from the tube toward a lowered position, and easily overcomes any lifting forces exerted on the float by the pressure differential between the tank and the tube.

Because of the mechanical advantage provided by the pivoting action of the float, it is possible to provide an orifice in the end of the drop tube of a diameter large enough to avoid plugging problems. Thus, the present invention obtains improved separation of the float from the tube orifice without requiring the use of an extremely small orifice.

An additional advantage obtained by the valve apparatus of the present invention resides in the ability of the float to pivot to a lowermost position in which it is almost in alignment with the drop tube. By permitting this orientation of the float, and by constructing the tube and float as tubular members, it is possible to insert the apparatus into a water system pressure tank through an existing vent tube having an inner diameter as small as 1.5–2 inches.

BRIEF DESCRIPTION OF THE DRAWING FIGURES

A preferred embodiment of the present invention is described in detail below with reference to the attached drawing figures, wherein;

FIG. 1 is a fragmentary side sectional view of an air volume control valve apparatus constructed in accordance with the preferred embodiment, illustrating the manner in which the apparatus is being assembled in a water system pressure tank, the float being extended downward so it can be inserted vertically through a small diameter vent tube;

FIG. 2 is a side elevational view, partially cut away, of an air volume control valve apparatus positioned within a water system pressure tank, illustrating the valve apparatus in an air venting position;

FIG. 3 is a side elevational view, partially cut away, of the air volume control valve apparatus in an air-sealing position;

FIG. 4 is a fragmentary side elevational view, partially in section, of a valve assembly forming a part of the control valve apparatus, illustrating the valve assembly in the air venting position; and FIG. 5 is a fragmentary side elevational view, partially in section, of the valve assembly in an air-sealing position.

DETAILED DESCRIPTION OF THE PREFERRED EMBODIMENT

A preferred embodiment of an air volume control valve apparatus constructed in accordance with the present invention and adapted for use within a pressure tank of a pressurized water supply system is illustrated in FIG. 2. The water supply system is conventional in nature and forms no part of the present invention. Only the tank of the system is shown or described in any detail.

The pressure tank 10 is formed by a cylindrical side wall 12 having closed upper and lower ends 14, 16. The inner diameter of the tank is preferably 24–36 inches, but may be of any desired size. Access to the interior of the tank is provided through an inlet 18 formed in the lower end of the tank, an outlet 20 formed in the side wall of the tank above the inlet, and a vent pipe 22 extending vertically through the upper end of the tank. In an exemplary system, the vent pipe 22 is formed of steel and includes an inner diameter of 1.5–2 inches. In addition, the upper end of the tube is internally threaded.

The valve apparatus is illustrated in FIG. 1, and broadly includes an elongated drop tube 24, a cap 26 provided on one end of the tube, and a valve assembly 28 provided on the opposite end of the tube. The drop tube 24 is formed of a tubular piece of steel or other suitable material, including a hollow interior space presenting an inner diameter of about 0.25 inches. The drop tube is designed to provide mechanical support to the valve assembly 28 within the tank while defining an air passageway for exhausting air from the tank.

The cap 26 is formed of plastic, steel or cast iron, and defines a support means for supporting the drop tube on the tank with the upper end of the tube exposed to an area exterior of the tank and the lower end of the tube disposed within the tank. The cap is received in and closes off the upper end of the vent pipe when the valve apparatus is in place so that the vent pipe is closed off except for the flow path defined through the drop tube.

The cap 26 is generally cylindrical in shape, presenting a lower end that is externally threaded to cooperate with the internal threads provided on the vent pipe. The cap also presents an upper end that is formed with at least one pair of opposed flat side surfaces 30, illustrated in FIG. 2, by which the cap may be gripped by a tool to permit assembly and disassembly of the cap on the pipe. Returning to FIG. 1, the cap is formed with a longitudinally extending central bore that is collinear with the longitudinal axis of the cap. The bore includes a large diameter section 32 adjacent the lower end of the cap and a small diameter section 34 nearer the upper end. The large diameter section 32 is of a diameter greater than the outer diameter of the drop tube 24 so that a space is defined between the tube and the cap within the large diameter section.

The lower end of the small diameter section 34 of the bore is threaded to receive the upper end of the drop tube 24, which is externally threaded. A generally radially extending vent 36 is connected between the upper end of the small diameter section 34 and an area exterior of the cap. This vent 36 provides communication between the drop tube and the area exterior of the tank when the apparatus is installed.

A radially extending gauge tap 38 may also be provided in the cap, and extends between the large diameter section 232 and the area exterior of the cap. This tap 38 may be used to attach a pressure gauge to the tank for monitoring the pressure within the tank, or to permit charging of air into the tank during the initial setup of the system. If no gauge is used with the apparatus, the gauge tap is simply plugged.

The valve assembly is illustrated in FIG. 4, and includes a seat member 40 and a float member 42, both of which are formed of PVC, or any other suitable non-absorbent material. The seat member 40 includes an upper end provided with a threaded bore within which the lower end of the drop tube 24, which is threaded, is received. A restricted orifice 44 extends through the seat member and connects the interior of the tube 24 with the area beneath the seat member so that the tube is in fluid communication with the interior of the tank when the apparatus is positioned on the tank. Preferably, the orifice 44 has a diameter of about 0.065 inches. This size is small enough to prevent the float member from sticking to the seat during use, and large enough to provide quick response time and to prevent plugging of the orifice by sediment or the like.

The lower end of the seat member defines a substantially flat horizontal bottom surface 46, and an annular seat 48 protrudes slightly beyond the lower surface around the orifice. In addition, a pair of laterally spaced lugs 50 extend downward from the bottom surface and are connected by a shaft or pin 52 that extends in a horizontal direction transverse to the longitudinal axis of the drop tube.

The float member 42 is shown in FIG. 1, and includes an elongated tubular body 54 that is closed at the ends by caps 56, 58. The body 54 is hollow, and is preferably 4–6 inches in length. The cap 56 includes a circular end plate 60 that covers and seals one end of the body, and a longitudinally extending arm 62. A transverse hole is provided in the arm for receipt on the shaft 52 of the seat member so that the float member is supported for pivoting movement relative to the seat member. The arm 62 also includes a shoulder 64 protruding beyond the pivot shaft away from the body 54. The shoulder 64 is sized and shaped to abut the bottom surface 46 of the seat member when the float reaches a lower, almost vertical position. Thus, the shoulder prevents the float member from actually reaching a vertical orientation, and insures that the float member will pivot upward about the shaft in the desired direction as the water level in the tank rises.

The cap 58 on the opposite end of the body 54 preferably includes a cup-shaped piece that is received on the body to prevent water from getting into the float member during use. Both caps 56, 58 are preferably attached to the float by an adhesive material which also seals the connections against water leakage. However, additional steps may be taken to guarantee a watertight assembly.

In order to provide reliable closure of the orifice 44 when the float member is raised to an upper position, as shown in FIG. 5, a circular patch 66 formed of a resilient material such as rubber or the like is provided on the float member in direct opposition to the orifice of the seat member. The patch 66 is attached to the float member either by an adhesive or through the use of a mechanical connection, such as by forming the patch with a protruding button adapted for receipt within a mating hole formed in the arm 62.

In order to install the apparatus on the tank of an existing pressurized water supply system, the valve assembly 28 and drop tube 24 are simply guided down into the vent pipe 22 until the cap 26 engages the upper end of the vent pipe. Thereafter, the cap 26 is threaded into engagement with the vent pipe through the use of a wrench which engages the opposed flat surfaces 30 of the cap.

The vertical position of the valve assembly 28 within the tank is dictated by the length of the drop tube 24. Preferably, the tube is of a length sufficient to position the valve assembly above the outlet 20 of the tank by at least 4–5 inches so that the float member 42 closes against the seat member 40 as long as the water within the tank is well above the outlet. Thus, the valve assembly opens and air is allowed to escape from the tank whenever the water level is forced downward by air pressure below this predetermined level.

Although not shown in the drawing figures, in the preferred orientation of the apparatus, the pivot shaft 52 of the valve assembly is aligned generally with a line extending radially from the central axis of the tank 10 so that the float member 42 pivots freely within the tank, and does not swing either directly toward or away from the side wall of the tank. Where the tank includes a central vertical pipe, as shown in FIG. 2, it is necessary to provide clearance for full pivoting movement of the float member.

During operation of the water supply system, air is maintained in the tank to establish a pressure for delivering water in the tank to downstream plumbing. However, some of the air is lost into the water and is recharged with each pumping cycle in a conventional manner so that the total volume of air in the tank is generally maintained. However, absent the control valve apparatus of the present invention, it is possible that the volume of air in the tank will gradually increase until the water in the tank is forced below the outlet, allowing air into the downstream plumbing.

In order to prevent the occurrence of such a condition, the valve apparatus is operable to release excess air from the tank as soon as the total volume of air in the tank is sufficient to force the water to a level below that necessary to maintain the float member against the seat member. As long as the water remains above the predetermined level, as shown in FIG. 3, no air is allowed to exhaust through the drop tube. However, as the level drops toward the level shown in FIG. 2, the float member drops away from the seat allowing the air in the tank to be exhausted.

As shown in FIG. 5, when the float member is in the upper pivoted position, the rubber patch 66 presses against the seat 48 with sufficient force to seal the orifice and prevent air from escaping from the tank. However, as the float member moves away from the seat member 40, the patch pulls away from the seat, allowing air to flow through the orifice. Because the center of mass and the center of buoyancy of the float member are both located outboard of the seat member opposite the pivot shaft, a mechanical advantage is obtained which substantially increases the force exerted by the patch on the seat when the float is raised to the upper pivoted position. In addition, this mechanical advantage is also present when the float pivots away from the tube toward a lowered position, and easily overcomes any lifting forces exerted by the pressure differential between the tank and the orifice.

The total range of movement of the float member during use will typically not exceed more than a few degrees of angular movement relative to the seat member since air is quickly exhausted as soon as the float member is unseated. Thus, the only time the shoulder 64 of the float member engages the bottom surface 46 of the seat member is during installation of the apparatus on a tank. As mentioned, the contact between the shoulder and the seat member prevents the float member from assuming a truly vertical orientation which might prevent the float from pivoting properly during use.

Although the invention has been described with reference to the preferred embodiment illustrated in the attached drawing figures, it is noted that substitutions may be made and equivalents employed herein without departing from the scope of the invention as recited in the claims.

What is claimed is:

1. An air volume control valve apparatus for use with a water system pressure tank, the apparatus comprising:

an elongated tubular drop tube presenting first and second axial ends and a passage through the tube;

a support means for supporting the drop tube on the tank with the first end of the tube exposed to an area exterior of the tank and the second end of the tube disposed within the tank;

a seat member secured to the second end of the drop tube, the seat member closing off the passage at the second axial end of the drop tube except for a restricted passageway in the seat member, and including a lower surface through which the restricted passageway extends, the seat member including an annular seat surrounding the restricted passageway and protruding from the lower surface; and an elongated float member having a first axial end supported for pivoting movement on the seat member about a pivot axis extending in a direction transverse to the length of the tube, and a second free end opposite the first end, the float member being buoyant in water so that as the water level rises in the tank beyond the predetermined level, the float member is lifted on the water to an upper pivoted position in which the float member, engages the seat, closing off the restricted passageway, and when the water level drops beneath the predetermined level, the float member pivots to a lowered position in which the restricted passageway is uncovered, the float member being provided with a patch of relatively resilient material that bears against the annular seat of the seat member when the float member is in the upper pivoted position, sealing the restricted orifice.

2. An air volume control valve apparatus as recited in claim 1, wherein the tank is closed except for an inlet in the bottom of the tank, an outlet disposed above the inlet, and a vent pipe extending through the tank at a height above the outlet, the support means including a cap which closes off the vent pipe while supporting the drop tube and valve means within the tank.

3. An air volume control valve apparatus as recited in claim 2, wherein the cap is threaded into the vent pipe.

4. An air volume control valve apparatus as recited in claim 2, wherein the first end of the drop tube is secured to the cap and the cap includes a vent passageway for providing fluid communication between the first end of the tube and an area outside the cap.

5. An air volume control valve apparatus as recited in claim 4, wherein the drop tube is threaded into the cap.

6. An air volume control valve apparatus as recited in claim 2, wherein the cap includes a gauge tap for providing fluid communication between the vent pipe and an area outside the cap when the cap is positioned in the vent pipe.

7. An air volume control valve apparatus as recited in claim 2, wherein the cap includes a pair of opposed planar contact surfaces by which the cap may be gripped to secure the cap within the vent pipe.

8. An air volume control valve apparatus as recited in claim 2, wherein the drop tube is sized to position the valve means at a predetermined height above the outlet.

9. An air volume control apparatus as recited in claim 1, wherein the seat member includes a pivot shaft on which the first axial end of the float is supported, and means for retraining the float member on the pivot shaft.

10. An air volume control apparatus as recited in claim 1, wherein the float member includes a shoulder protruding beyond the pivot axis away from the second end of the float member, and the seat member presents a lower surface that is engaged by the shoulder in a lowermost position of the float member to prevent the float member from reaching a vertical orientation.

11. An air volume control apparatus as recited in claim 1, wherein the float member is tubular in shape, having a length of between about 4–6 inches.

12. An air volume control valve apparatus as recited in claim 1, wherein the restricted orifice has a diameter of about 0.065 inches.

* * * * *